US006730446B2

(12) United States Patent
Sahouani et al.

(10) Patent No.: US 6,730,446 B2
(45) Date of Patent: May 4, 2004

(54) DUAL COLOR GUEST-HOST POLARIZERS AND DEVICES CONTAINING GUEST-HOST POLARIZERS

(75) Inventors: Hassan Sahouani, Hastings, MN (US); Kim Marie Vogel, Lake Elmo, MN (US); Martin B. Wolk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/348,786

(22) Filed: Jan. 22, 2003

(65) Prior Publication Data

US 2003/0147043 A1 Aug. 7, 2003

Related U.S. Application Data

(62) Division of application No. 09/426,288, filed on Oct. 25, 1999, now Pat. No. 6,538,714.

(51) Int. Cl.[7] ................................................. G03F 7/34
(52) U.S. Cl. ....................................... 430/20; 430/200
(58) Field of Search ................................... 430/20, 200

(56) References Cited

U.S. PATENT DOCUMENTS

| | | |
|---|---|---|
| 2,400,877 A | 5/1946 | Dreyer |
| 2,544,659 A | 3/1951 | Dreyer |
| 4,030,812 A | 6/1977 | Strebel |
| 4,031,092 A | 6/1977 | Strebel |
| 4,466,704 A | 8/1984 | Schuler et al. |
| 4,634,225 A | 1/1987 | Haim et al. |
| 4,770,500 A | 9/1988 | Kalmanash et al. |
| 5,124,824 A | 6/1992 | Kozaki et al. |
| 5,132,147 A | 7/1992 | Takiguchi et al. |
| 5,235,449 A | 8/1993 | Imazeki et al. |
| 5,380,459 A | 1/1995 | Kanemoto et al. |
| 5,406,396 A | 4/1995 | Akatsuka et al. |
| 5,474,731 A | 12/1995 | Morikawa et al. |
| 5,521,035 A | 5/1996 | Wolk et al. |
| 5,526,150 A | 6/1996 | Mazaki et al. |
| 5,568,290 A | 10/1996 | Nakamura |
| 5,576,862 A | 11/1996 | Sugiyama et al. |
| 5,589,963 A | 12/1996 | Gunning, III et al. |

(List continued on next page.)

FOREIGN PATENT DOCUMENTS

| | | |
|---|---|---|
| EP | 0 182 632 | 5/1986 |
| EP | 0 605 191 | 7/1994 |
| EP | 397 263 | 12/1994 |
| JP | 62-69202 | 3/1987 |
| JP | 10-333154 | 6/1997 |
| WO | WO 96/16015 | 5/1996 |
| WO | WO 97/38864 | 10/1997 |
| WO | WO 97/39380 | 10/1997 |

OTHER PUBLICATIONS

Goldmann, Daniel and Janietz, Dietmar, "New disc–shaped triarylamino–1, 3,5–triazines with heteroaromatic central cores", Liquid Crystal, vol. 21, No. 5, pp. 619–623, 1996.

Hochbaum, A., et al., "51.3; Cholesteric Color Fitters: Optical Characteristics, Light Recycling, and Brightness Enhancement", SID 99 Digest, pp. 1063–1065, 1999.

Radley, Keith and Saupe, Alfred, "Cholesteric States of Micellar Solutions", Molecular Physics, vol. 35, No. 5, pp. 1405–1412, 1978.

*Primary Examiner*—Richard L. Schilling
(74) *Attorney, Agent, or Firm*—Robert J. Pechman

(57) ABSTRACT

A guest-host polarizer is disclosed that includes a host matrix, one or more first guest dyes disposed in the host matrix and oriented to absorb a first portion of visible light having a first polarization state, and one or more second guest dyes disposed in the host matrix and oriented to absorb a second portion of visible light having a second polarization state orthogonal to the first polarization state. Such guest-host polarizers can be used in various optical applications and display constructions.

10 Claims, 4 Drawing Sheets

U.S. PATENT DOCUMENTS

| | | |
|---|---|---|
| 5,610,743 A | 3/1997 | Tsai |
| 5,631,051 A | 5/1997 | Ito |
| 5,672,296 A | 9/1997 | Shen et al. |
| 5,693,446 A | 12/1997 | Staral et al. |
| 5,751,389 A | 5/1998 | Andreatta et al. |
| 5,751,483 A | 5/1998 | Itoh et al. |
| 5,861,931 A | 1/1999 | Gillian et al. |
| 5,877,831 A | 3/1999 | Leenhouts et al. |
| 5,948,487 A | 9/1999 | Sahouani et al. |
| 5,953,089 A | 9/1999 | Hiji et al. |
| 6,295,108 B1 | 9/2001 | Kaneko |

DUAL COLOR GUEST-HOST POLARIZERS AND DEVICES CONTAINING GUEST-HOST POLARIZERS

CROSS REFERENCE TO RELATED APPLICATIONS

This application is a divisional of U.S. Ser. No. 09/426,288, filed on Oct. 25, 1999, now U.S. Pat. No. 6,538,714.

The present invention relates generally to colored dichroic polarizers and to their use in electronic display devices.

BACKGROUND

Dichroic materials are useful for preferentially transmitting light polarized in one direction relative to light polarized in other directions. When a dichroic material is placed in the path of a beam of randomly polarized light and the component of transmitted light polarized in one plane is of low or negligible luminous flux compared to the luminous flux of light polarized in the orthogonal plane, the transmitted light is said to be linearly polarized, and the layer of dichroic material is referred to as a linear dichroic polarizer. Dichroic polarizers may transmit light of a particular polarization over a relatively wide spectrum, such as the visible spectrum, and may additionally perform a color filtering function by transmitting light of a particular polarization in only limited ranges of wavelengths.

One class of material suitable for producing dichroic effects is the class known as pleochroic dyes. A pleochroic dye molecule is a molecule having a light absorption spectrum that varies as a function of the orientation of the molecule with respect to the polarization of incident light. Dichroic polarizers can be made by forming a layer of oriented pleochroic dye molecules on a substrate. Pleochroic dye molecules that are self-orienting when applied to a suitable substrate are known, as are pleochroic dye molecules which require the application of some other orienting means, such as blending with or otherwise combining with an oriented matrix material in order to produce suitable orientation.

Oriented pleochroic dyes typically transmit light polarized orthogonally to the dye molecule orientation, and absorb all other light, except that light polarized corresponding to the dye molecule orientation and having the color of the dye is transmitted. Since the optical function of most polarizers is to block substantially all light not of the desired polarization, single pleochroic dyes are of limited use as polarizers. More complete polarization can be achieved by incorporating several pleochroic dyes into the polarizer, so as to cover a larger portion of the visible spectrum, thereby producing, for example, a neutral density polarizer. Any desired color filtering can then be provided by a separate color filter.

SUMMARY OF THE INVENTION

There currently exists a need for colored polarizers that can transmit light of a specific color and one polarization, and either block substantially all visible light or transmit a different color of light of the other polarization. As described in connection with the present invention, such polarizers can be patterned and used as an improved color filter. Such polarizers can also be used to achieve stylized color effects in reflective, transmissive, or transflective displays.

In an exemplary embodiment, the present invention provides a guest-host polarizer that includes a host matrix and at least a first guest dye and a second guest dye. The first guest dye is disposed in the host matrix and oriented to absorb a first portion of visible light having a first polarization state, and the second guest dye is disposed in the host matrix and oriented to absorb a second portion of visible light having a second polarization state orthogonal to the first polarization state.

In another exemplary embodiment, the present invention provides a transflective liquid crystal display that includes a backlight, a liquid crystal material disposed between a top substrate and a bottom substrate to selectively alter a polarization of light transmitted threrethrough, a transflector disposed between the backlight and the liquid crystal material, a bottom polarizer disposed between the transflector and the liquid crystal material, and a top polarizer positioned adjacent to the top substrate. Either or both of the bottom polarizer and top polarizer includes a guest-host polarizer that has a host matrix, one or more first guest dyes disposed in the host matrix and oriented to absorb a first portion of visible light having a first polarization state, and one or more second guest dyes disposed in the host matrix and oriented to absorb a second portion of visible light having a second polarization state orthogonal to the first polarization state.

In still another exemplary embodiment, the present invention provides a polarizer construction that includes a reflective polarizer and one or more colored dichroic polarizers. The reflective polarizer is disposed on one side of the construction and the colored polarizer(s) is/are disposed on the other side of the construction. The one or more colored dichroic polarizers are arranged so that when the construction is illuminated from the first side, an observer viewing the construction from the second side will observe a first spectral distribution of visible light and when the construction is illuminated from the second side, an observer viewing the construction from the second side will observe a second spectral distribution of visible light different from the first spectral distribution.

In still another exemplary embodiment, the present invention provides a color liquid crystal display that includes a liquid crystal material disposed between two parallel display panel substrates, at least one of the display panel substrates having an array of color filters disposed thereon. At least one of the color filters includes a guest-host polarizer that has a host matrix, one or more first guest dyes disposed in the host matrix and oriented to absorb a first portion of visible light having the first polarization state, and one or more second guest dyes disposed in the host matrix and oriented to absorb a second portion of visible light having the second polarization state orthogonal to the first polarization state.

In another exemplary embodiment, the present invention provides a projector system that includes a projector engine that emits one or more colors of light having one polarization and one or more other colors of light having an orthogonal polarization, a screen disposed to display the light emitted from the projector engine, and a colored polarizer disposed between the screen and the projection engine. The colored polarizer can be arranged to substantially transmit the same colors and polarizations of light emitted by the projector engine so that the intensity of the image produced on the screen is not significantly reduced by the polarizer, while at the same time the polarizer filters ambient light.

In yet another exemplary embodiment, the present invention provides a method for imagewise placement of polarizing elements. The method includes providing a donor element that has a base sheet, a guest-host polarizer transfer layer, and a light-to-heat conversion layer disposed between the base sheet and the guest-host polarizer transfer layer. Next, the transfer layer of the donor element is placed in contact with a receptor substrate and portions of the transfer layer are transferred from the donor element to the receptor substrate by exposing selected areas of the donor element to imaging radiation. Finally, the donor element is removed from the receptor substrate.

DETAILED DESCRIPTION

Figure 1:
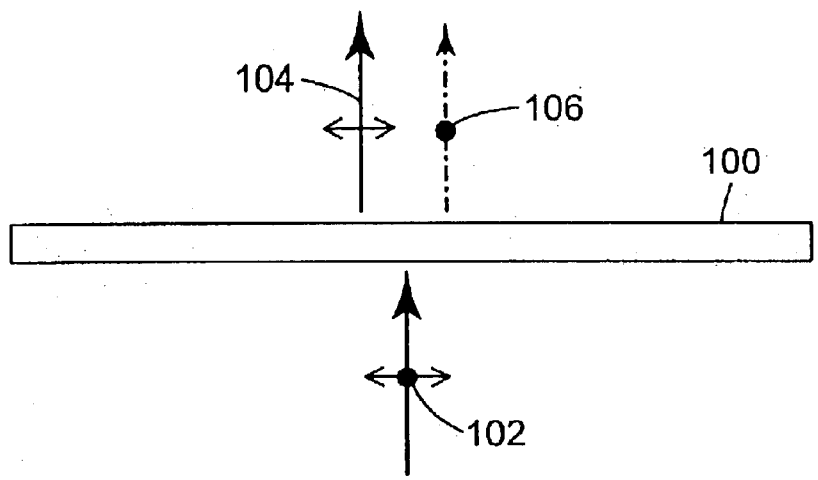
FIG. 1 is a schematic side view of a colored polarizer useful in the present invention.

FIG. 1 shows a colored polarizer 100 useful in the present invention. Colored polarizer 100 includes a single layer that transmits incident light having different spectral characteristics depending on the plane of polarization. For example, when randomly polarized light 102 is incident on colored polarizer 100, light of a first linear polarization state 104 ("↔" indicates polarization in the plane of the page) can be transmitted having a first spectral distribution, and light of a second, orthogonal linear polarization state 106 ("•" indicates polarization perpendicular to the plane of the page) can be transmitted having a second spectral distribution different from the first. Light that is not in the transmission spectrum for a given polarization state is substantially absorbed by polarizer 100. For example, colored polarizer 100 can transmit one color of light having one polarization state and another color of light having the orthogonal polarization state (color/color, or dual color). Colored polarizer 100 can also be made to transmit one color of light having one polarization state and to absorb substantially all visible light of the other polarization state (color/black). Colored polarizer 100 can also be made to transmit substantially all visible light having one polarization state and to absorb substantially all visible light of the other polarization state (white/black, or neutral density). Table 1 shows examples of some possible color combinations for each of the two orthogonal linear polarization states that can be transmitted by polarizer 100. Other desired color combinations are also contemplated by the present invention.

TABLE 1

("X" denotes possible color combination)

| | Color Transmitted in First Polarization State | | | | | | |
|---|---|---|---|---|---|---|---|
| | Black | Red | Green | Blue | Magenta | Cyan | Yellow |
| Color Transimitted in Second Polarization State | | | | | | | |
| Black |   | X | X | X | X | X | X |
| Red | X |   | X | X | X | X | X |
| Green | X | X |   | X | X | X | X |
| Blue | X | X | X |   | X | X | X |
| Magenta | X | X | X | X |   | X | X |
| Cyan | X | X | X | X | X |   | X |
| Yellow | X | X | X | X | X | X |   |

As used herein, the term "color" denotes a spectral distribution of less than the whole visible spectrum as is expected when one or more dyes are used to absorb light in one or more portions of the visible spectrum and to thereby transmit a color of light. Color can be understood in the context of the various dye-related arts. In this respect, transmitting a color of light means transmitting one or more wavelengths or wavelength bands of light in the visible spectrum, or in the case of black, substantially no wavelengths in the visible spectrum. The special case of black also includes dark shadings of gray where small amounts (e.g., no more than about 10% or 15%) of any or all visible wavelengths might be transmitted but still does not result in a dominant coloration.

Colored polarizers useful in the present invention can be made in various ways. Colored polarizers exhibiting a wide range of spectral characteristics for either or both polarization states can be made that include a host matrix and at least two types of guest dyes in a single layer. In an exemplary embodiment, a colored polarizer of the present invention can include a molecular matrix that holds two or more types of dye molecules, at least one of the types being pleochroic dye molecules arranged in one or more predetermined orientations, so as to polarize incident light depending on color.

Molecular matrices can be used that orient different pleochroic dyes in different directions, depending on the chemical structure of the particular dye being oriented. Combinations of different dyes can be incorporated into the dichroic layers, whereby different dyes can be oriented differently in relation to the chosen molecular matrix. In this way, combinations of two or more like-orienting or differently-orienting dyes can be used to provide a single layer colored polarizer that is color/color (transmits a color of light one polarization state and a color of light a different polarization state), color/black (transmits one color of one polarization state and absorbs substantially all visible light of the other polarization state), or white/black (transmits substantially all visible light of one polarization state and absorbs substantially all other visible light).

Alternatively, rather than using differently orienting pleochroic dyes, colored polarizers can be made using one or more pleochroic dyes that orient in the same direction along with one or more non-orienting dyes, all disposed in a molecular matrix. In such an embodiment, the color of light of one polarization is determined by the wavelengths of light absorbed by the oriented pleochroic dye or dyes and by the wavelengths of light absorbed by the non-orienting dye or dyes, whereas the color of light of the orthogonal polarization is determined by the wavelengths of light absorbed by the non-orienting dye or dyes. For example, a yellow/green colored polarizer can be made using a blue orienting dye and a yellow non-orienting dye so that both dyes are oriented to give green light for one polarization state and only the yellow dye is oriented to give yellow light for the orthogonal polarization state.

Using a combination of orienting and non-orienting dyes to create a colored polarizer can provide more flexibility in selecting dyes. For example, once one or more suitable orienting dyes have been chosen for an application, one or more non-orienting dyes can be freely chosen and added to the formation to produce a variety of color combinations. Different color combinations can be achieved by changing the non-orienting dyes without changing the orienting dyes chosen for the application. In addition, non-orienting dyes might be more commercially available, especially when higher purity dyes are desired.

Dichroic polarizing layers suitable for use as colored polarizers in the present invention can be formed by coating an aqueous solution of one or more pleochroic guest dyes and a lyotropic liquid crystal host material onto a solid substrate and drying the coating. Exemplary substrates include glass and rigid polymeric substrates as well as flexible polymer films, multilayer films, optical stacks, structured films or substrates, and the like. Exemplary substrates can also include other components useful in displays such as polarizers, color filters, black matrix, electronically addressable active or passive devices (e.g., transparent electrodes, thin film transistors), and the like. Exemplary substrates can also include partially- or fully-assembled display panels.

Guest-host polarizers according to the present invention can exhibit surprisingly improved heat resistance, especially when applied to a glass substrate. Heat resistance can be important, especially for constructions that may be subjected to elevated temperature processing or for displays that might generate heat during operation.

In an exemplary embodiment, lyotropic nematic liquid crystalline materials can be used as the molecular or host matrix of guest-host polarizers. Liquid crystalline matrix materials containing at least one triazine group can be especially useful. Matrix materials in this class can act as hosts to a variety of guest dyes while imparting the same or different orientations to different dyes. This can enable single polarizing layers to be produced using suitable choices of dyes that allow transmission of different colors in different polarization planes.

When coating a liquid solution of the host compound with one or more suitable guest dyes, shear can be applied to the liquid layer to impart an ordered structure to the liquid crystalline host material. For sufficient applied shear, the oriented liquid crystalline structure can orient the pleochroic guest dye or dyes to produce an oriented coated layer that can be dried to produce a single layer that has dichroic polarizing properties. Because the levels of shear stress created in the liquid layer during coating are low compared to the shear stresses which might cause mechanical deformation of rigid substrates, the process of forming the dichroic layer has a reduced tendency to create stresses that might distort the optical properties of the substrate. For certain applications, such as those where the substrate for coating is a temporary carrier of a colored polarizer or those where it is desirable to also orient the substrate through applying shear, more flexible substrates can be used without particular regard to degrading the optical properties.

A particular type of guest dye can be used singly to produce dichroic effects over a limited range of wavelengths, or in combination with other guest dyes to produce dichroic effects over a wider range of wavelengths as might be useful, for example, in producing a neutral density polarizer or a dual color polarizer. The direction of orientation of the dyes is in general a function of the direction in which the coating is carried out. Some types of dyes produce polarizers having a transmission axis in the direction of coating, while other types of dyes produce polarizers having a transmission axis perpendicular to the direction of coating. Dyes from these two classes can be combined in a single guest-host polarizer to produce different color combinations.

Molecular matrix materials suitable for the present invention include lyotropic nematic liquid crystal host compounds of the type disclosed in U.S. Pat. No. 5,948,487 and in and co-assigned U.S. patent application Ser. No. 09/172,440, the disclosures of which are wholly incorporated by reference into this document. The structures of exemplary host compounds include the following structures, labeled Compound A and Compound B:

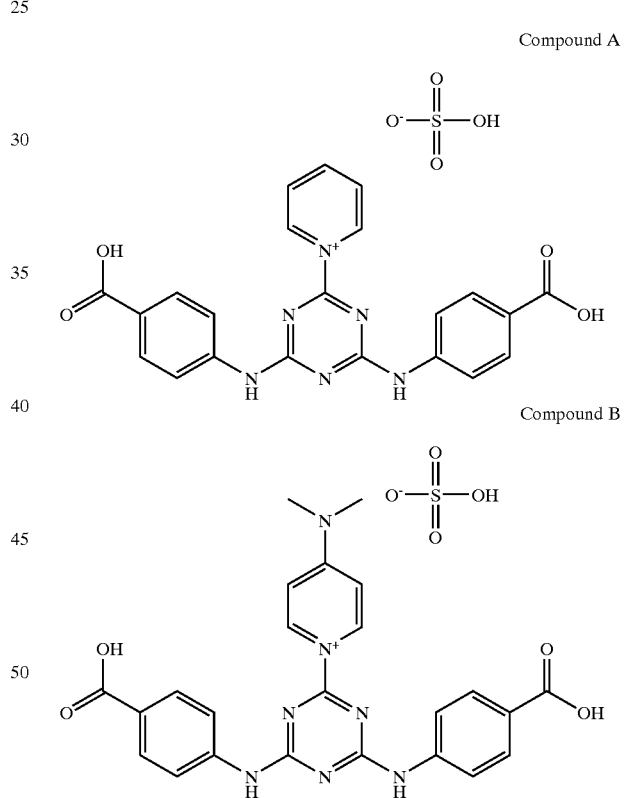

One class of dyes, when used with host compounds of the present invention in aqueous solution, can align themselves in relation to the host compounds in such a manner as to pass substantially all visible light polarized in a plane parallel to the direction of coating. These dyes are called parallel-colorless dyes. An exemplary class of guest dyes that behave in this manner are the triazine dyes, also commonly referred to as reactive dyes. Examples of these dyes include Reactive Red 187 available as Reactive Red KB from Keystone Corp., Chicago, Ill., and Reactive Red 120 commercially available under several trade designations.

Dyes that can align themselves in relation to the host compounds so as to pass substantially all visible light polarized in a plane perpendicular to the direction of coating are called perpendicular-colorless dyes. An exemplary class of dyes that behaves in this manner is the class known as direct dyes. Examples of commercially available direct dyes are Black RPM (commercially available from Crompton & Knowles Colors, Inc., Charlotte, N.C.), Black SP (commercially available from Keystone Corp.), and Direct Yellow 86 (commercially available from Crompton & Knowles Colors, Inc. under the trade designation Intrajet Yellow DJR).

Guest-host coating solutions containing host and guest compounds as described above can be prepared by first preparing an aqueous solution of water and a pH-adjusting compound such as $NH_4OH$. The coating solution can then be prepared by dissolving the host compound and the guest compound, along with other additives such as surfactants to improve coatability, in the aqueous solution. Suitable water-soluble polymeric binders can also be added in small amounts to the host solutions in amounts ranging from less than 1% by weight to 5% or more. Polymers that have been found useful for this purpose include dextran-type polymers or their sulfates and sulfonated polystyrene. The host compound can typically be added in amounts sufficient to form a lyotropic solution having a host compound concentration of about 8% to 20% by weight of solution, though concentrations in the range of about 10% to 16% are often preferable. Host solution concentrations outside of this range can also be used provided that a desired level of functionality is maintained. For example, the resulting solution should provide sufficient ordering of the guest-host structure after coating to act as a polarizer, and the resulting coating solution should be sufficiently concentrated to provide adequate coating thickness and dryability, but not so concentrated as to be prohibitively difficult to coat and orient after coating.

If it is desired to polarize light in only a selected range of wavelengths, a single dye may be used in the guest-host solution. If it is desired to provide a neutral density polarizer, that is to say a polarizer which polarizes light in a substantially equal manner over the visible spectrum, several guest dyes of different colors, but similar orientations can be added to the host solution. Polarizers that are of substantially neutral density can, for example, be produced by adding similarly orienting cyan, magenta, and yellow dyes to the host solution, or, alternatively, by adding similarly orienting violet and yellow dyes to the host solution. Many other dye combinations are also possible. If it is desired to transmit one color of light of one polarization and another color of light (or no visible light) of another polarization, two or more guest dyes can be used, at least two of which orient differently upon coating. For the purposes of this disclosure, non-orienting dyes and dyes that orient in a particular direction upon coating or shearing are to be considered differently orienting dyes.

A particularly useful combination of guest dyes can be obtained when parallel-colorless dyes are combined with perpendicular-colorless dyes so as to form a colored polarizer that blocks substantially all light of one polarization and passes only a specific color of light of the orthogonal polarization. For example, a suitable combination of perpendicular-colorless guest dyes can be used to form a neutral density polarizer that passes light perpendicular to the coating direction but blocks light parallel to it. A parallel-colorless dye having a specific color can likewise be added to the guest-host combination thereby transmitting light of a specific color polarized perpendicular to the coating direction. Such colored polarizers can be useful as color filters, for example, in color liquid crystal displays.

Another useful combination of parallel-colorless dyes and perpendicular-colorless dyes is one that forms a dual color polarizer that transmits a color of light polarized parallel to the coating direction and that transmits another color of light polarized perpendicular to the coating direction. For example, a yellow parallel-colorless dye and a red perpendicular-colorless dye could be combined in the same host to provide a single layer dual color polarizer. As discussed in more detail below, dual color polarizers can be used to achieve unique effects, especially in transflective liquid crystal displays, or simply in combination with a reflective polarizer.

Another useful combination of differently orienting dyes includes one or more parallel-colorless dyes and/or one or more perpendicular-colorless dyes along with one or more non-orienting dyes. Such combinations can be useful in forming color/color polarizers as well as color/black polarizers.

In general, polarizer performance improves with improved dye purity, since impurities such as salts and organic nonionic materials found in some commercially available dyes tend to absorb all visible light, regardless of polarization, thereby reducing the efficiency of the polarizer, giving the filter a darker tint even in the transmissive polarization. It is often desirable that the level of impurities in the dyes be in the range of 1% or lower based upon the weight of the dye present. The number of guest dye molecules present in the guest-host solution may approach the number of host molecules, but it is preferred that there be somewhat fewer guest dye molecules than host molecules.

Coating of the guest-host solution onto solid substrates can be performed by any convenient means, though coating methods which impart some shear stress to the coated layer during coating may be preferred. Coating techniques that can impart shear stresses range from using wire-wound coating rods to conventional extrusion dyes. Shear stress imparted to the coated layer during coating can serve to urge molecular ordering of the guest and host molecules.

Drying of the coated layer can be performed by any means suitable for drying aqueous coatings which does not damage the coating or significantly disrupt any molecular ordering of the coated layer which may have been produced by shear stress or other ordering effects applied during coating.

Guest-host polarizers of the present invention can also be patterned on a substrate using photolithography techniques, thermal mass transfer techniques, and/or other suitable patterning techniques. For example, a dichroic polarizing layer can be coated onto a carrier substrate to form a donor element. The polarizing layer can then be transferred in an imagewise fashion by thermal-head, light-induced, or other forms of thermal mass transfer from the donor element to a receptor substrate such as a display panel or other suitable substrate. An exemplary method of thermal mass transferring colored polarizing layers from a donor element includes light induced thermal transfer from a donor element that includes, in the following order, a base sheet (typically a flexible polymer film such as a polyester film), a light-to-heat conversion layer (typically a radiation absorber such as carbon black or an infrared absorbing dye dispersed in a binder), an optional interlayer, and a transfer layer which includes the colored polarizing layer. As disclosed in U.S. Pat. No. 5,693,446, the disclosure of which is incorporated by reference into this document, polarizing materials can be imagewise transferred by placing donor elements in contact with a receptor substrate and irradiating selected areas of the donor element with imaging radiation such as with a laser or a flash lamp through a mask. As described in more detail below, patterning colored polarizers can be especially useful in the production of color filters in liquid crystal displays that combine in one layer the function of a color filter and a polarizer and may give rise to unique color-changing capabilities.

Another patterning method includes selective bleaching of colored polarizers to bleach one or more dyes in selected areas. In this way, selected areas of a colored polarizer can be exposed to a solution or material that bleaches one or more dyes. For example, a colored polarizer can have a particular dye bleached out in a pattern to form characters or other indicia that are visible for one polarization of light but that are not visible for another polarization of light. Such a function can be useful, for example, in security elements.

Substrates used for coating and/or patterning guest-host polarizers can include a wide variety of suitable substrates. For example, substrates can include glass or plastic substrates that are transparent or partially transparent, that are colored or clear, that are birefringent or non-birefringent, that include additional optically active layers or not, that include active or passive electronic devices or not, or that include any other layers or materials, whether integral with or added to the substrates, especially those that can be used to affect or control the transmission, reflection, or absorption of light through an overall display construction.

In exemplary embodiments, guest-host polarizers can be coated or patterned onto substrates that have patterned electrodes (e.g., transparent conductive oxide stripes such as indium tin oxide (ITO)) and/or that have matrix of thin film transistors (TFTs) or other active devices. This includes coating or patterning guest-host polarizers directly on top of electrodes and/or TFTs, on top of an intermediate layer, such as a planarization layer, provided on the electrodes and/or TFTs, or on a surface of the substrate opposing the surface having the electrodes and/or TFTs. Alternatively, Guest-host polarizers can be coated or patterned onto substrates that are later equipped with electrodes and/or active devices. In other exemplary embodiments, guest-host polarizers can be coated or patterned onto polarizers (or onto substrates that include polarizing layers), whether the polarizers are absorptive or reflective. Generally, coating or patterning onto polarizers or constructions containing polarizers is performed so that a transmission axis of the guest-host polarizer(s) is positioned in a desired relationship with a transmission, reflection, or absorption axis of one or more other polarizers included in the construction.

Figure 2:
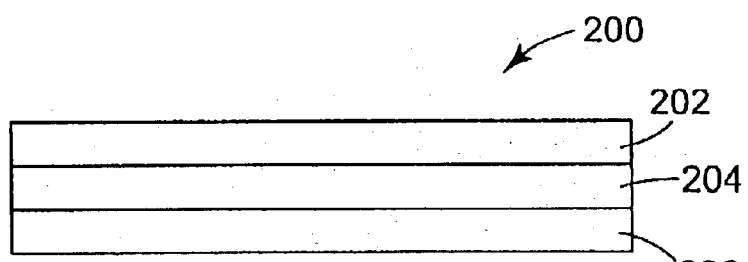
FIG. 2 is a schematic side view of an optical construction that includes a colored polarizer.

Colored polarizers made according to the present invention can be used in various optical applications, either alone or in combination with other polarizers and optical components and in various display constructions. For example, FIG. 2 shows a construction 200 suitable for laminating or otherwise adhering to a substrate for a display application. Construction 200 includes an optional top surface treatment 202, polarizer 204, and optional adhesive 206. Polarizer 204 can be a colored polarizer according to the present invention. Layer 202 can be any suitable surface treatment chosen for its optical or physical characteristics. For example, layer 202 can be an anti-reflection coating, an anti-smudge coating or other low surface energy coating, a textured coating, or the like. Such surface treatments can be useful especially when the surface is an external surface. For example, anti-reflection coatings and textured surfaces can help control reflective light and reduce glare. Anti-soil and low surface energy coatings can make the surface easy to clean and can enhance durability and handling characteristics. Optional adhesive layer 206 can be provided to allow lamination of construction 200 to a substrate or display panel, for example. Layer 206 can be an optically clear pressure-sensitive adhesive, an ultraviolet light (uv) cured liquid adhesive, a thermally cured adhesive, an autoclave adhesive, an optically diffuse adhesive, or the like. When construction 200 is to be used under conditions where polarized light is incident on construction 200, it may be preferable that optional adhesive layer 206, if used, can maintain the polarization of incident light. Construction 200 can be bonded to various suitable substrates which include liquid crystal displays, mirrors, reflective polarizers, dichroic polarizers, retardation films, or other illumination systems.

An exemplary construction includes polarizer 204 placed adjacent to a projector screen (not shown). Such a construction might be suitable as a contrast enhancing screen for use with a projector engine, for example, that emits one or more colors of light (e.g. blue light) having one polarization state and one or more other colors of light (e.g. red light and green light) having an orthogonal polarization state. In such a case, a colored polarizer designed to transmit the same or similar colors and polarization states of light as emitted by the projector engine can be disposed adjacent to the projector screen between the screen and the projector engine. In this way, the colored polarizer can be used to filter out a portion of the ambient light without significantly reducing the intensity of light projected onto the screen, thereby enhancing contrast.

Figure 3:
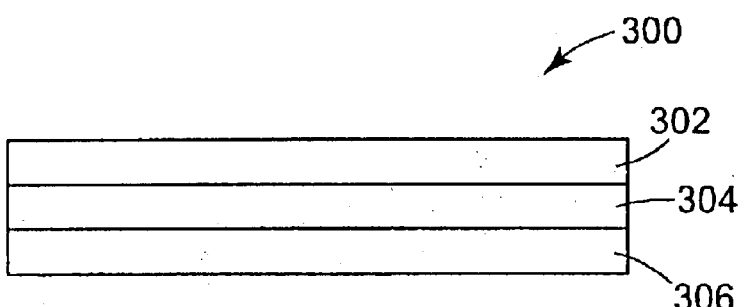
FIG. 3 is a schematic side view of an optical construction that includes a colored polarizer.

FIG. 3 shows another optical construction 300 that includes a colored polarizer 302, an optional adhesive layer 304, and a reflective or transflective layer 306. Optional adhesive layer 304 can be an optically clear pressure sensitive adhesive, a uv cured liquid adhesive, a thermally cured adhesive, an autoclave adhesive, or a diffuse adhesive. In an exemplary embodiment, adhesive layer 304 substantially maintains the polarization of light transmitted through it. Reflector/transflector 306 can be any suitable reflective layer that at least partially reflects light incident from the colored polarizer side of construction 300. For example, reflective layer 306 can be a mirror that is either specularly or diffusely reflective, a partial reflector or a partially metallized mirror, a multi-layer reflector, a colored mirror, a reflective polarizer, a tilted mirror array, a microprism array, a holographic transflector, or the like. Reflective layer 306 can be selected to substantially reflect either all or a portion of the visual spectrum. Examples of diffuse mirrors suitable for reflective coating 306 include a textured metal surface or specular flakes dispersed in an optically clear matrix. Examples of reflective polarizers suitable for use as reflective layer 306 include multi-layer birefringent reflective polarizers, diffuse reflective polarizers, and cholesteric polarizers.

Using a reflective polarizer as a reflector/transflector 306 in combination with a dual color guest-host polarizer 302 in construction 300 can give rise to unique color-changing properties depending on the direction of incident light. For example, when viewed from the colored polarizer side, construction 300 can be observed to be one color when illuminated from the front (viewer) side and another color when illuminated from the back side. By using a reflective polarizer as element 306 that reflects one polarization state and transmits the other polarization state, light incident from the front side can be reflected by the reflective polarizer in one polarization state so that when the dual color polarizer is properly aligned, only one color is observed. In the converse situation, light incident from the back side can be transmitted by the reflective polarizer in the orthogonal polarization state so that when transmitted through the dual color polarizer, a different color is observed.

Color changing with the direction of incident light can be achieved using, for example, a reflective polarizer that reflects and transmits linearly polarized light having orthogonal polarizations (e.g., a multilayer birefringent reflective polarizer), or using a cholesteric reflective polarizer that reflects and transmits circularly polarized light having orthogonal polarizations (right-handed polarization being considered orthogonal to left-handed polarization). When cholesteric reflective polarizers are used with colored dichroic polarizers to achieve color changing effects, a quarter wave plate can be added between the colored polarizer and the cholesteric reflective polarizer to convert light transmitted between the cholesteric and colored polarizers from circularly polarized to linearly polarized and vice versa depending on the direction of incident light.

Optical construction 300 can also include an optional diffuser (preferably a polarization maintaining diffuser) disposed on either side of the colored polarizer 302, or an optional retarder, compensator, or quarter wave plate disposed between the colored polarizer 302 and the reflector/transflector 306. For example, a quarter wave plate can be especially useful when the reflector/transflector 306 is a cholesteric reflective polarizer, as discussed above.

Optical construction 300 can be used, for example, in a reflective or transflective liquid crystal display as a rear light management element. An optically clear laminating adhesive (not shown) can be used to bond and optically couple the optical construction 300 to a liquid crystal cell. Optical construction 300 can be bonded to a liquid crystal cell either with colored polarizer 302 facing the liquid crystal cell or with reflective layer 306 facing the liquid crystal cell.

In exemplary embodiments, reflective layer 306 can be a multilayer birefringent reflective polarizer or a cholesteric reflective polarizer that reflects light having one polarization state and transmits light having an orthogonal polarization state. When using reflective polarizers for layer 306, it can be desirable to combine optical construction 300 with a liquid crystal cell so that colored polarizing layer 302 faces the liquid crystal cell. In such a construction, an optional back light can be added behind the reflective polarizer of optical construction 300 so that the liquid crystal display can be used in transmissive mode as well as reflective mode. Using such constructions, various stylized effects and unique appearances can be obtained. For example, colored polarizer 302 can be selected according to the present invention to transmit one color of light (e.g., red light) having a first polarization state and to transmit another color of light (e.g., green light) having a second, orthogonal polarization state. In transmission mode, when the back light is used to illuminate the liquid crystal display, this construction could be used, for example, to display red text and characters on dark background. When the display is used in reflective mode, the display could exhibit an image reversal and a color change to display text and characters that are dark on a green background, for example. The concepts of image reversal and color changing for transflective liquid crystal displays using colored polarizers according to the present invention can be generalized to any particular color combination for characters and background, for example, such as the color combinations indicated in Table 1.

The concepts of image reversal and color changing can also be generalized to systems that use a reflective polarizer (cholesteric or otherwise) and two or more separate color dichroic polarizers disposed on the same side of the reflective polarizer, at least two of the color dichroic polarizers chosen to transmit different colors and arranged to have crossed extinction axes. In this configuration, similar color changing and image reversal effects can be achieved as described above for single layer dual color guest-host polarizers but instead using two or more single color dichroic polarizers. Therefore, the present invention contemplates the use of two or more single color dichroic polarizers in combination with a reflective polarizer (and quarter wave plate, if desired, as described) to achieve an optical construction that exhibits polarized light of one color when illuminated from one side and polarized light having another color when illuminated from the other side. This construction could be inserted into a liquid crystal display, for example, to provide unique color changing and/or image reversal effects.

Currently, displays that exhibit an image reversal switch from dark characters on a light (white) background to light (white) characters on a dark background upon switching between reflective and transmissive modes. In certain environments where both front and back light illuminates the display, the display contrast can appear washed-out. One advantage of dual color image reversal according to the present invention is that the use of color-on-color or color-on-dark contrast can be made less susceptible to contrast wash-out.

Figure 4:
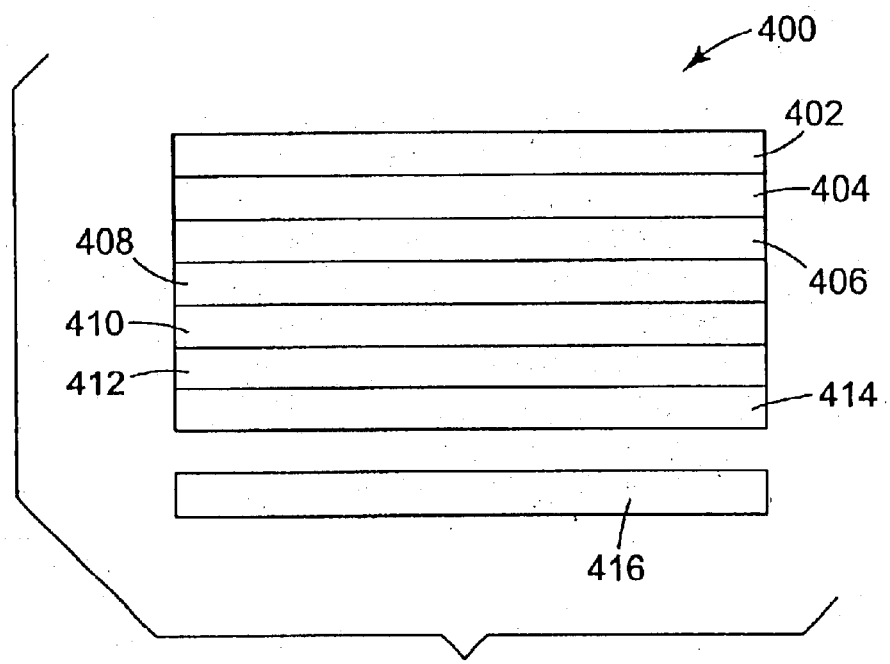
FIG. 4 is a schematic side view of a display that includes one or more colored polarizers.

FIG. 4 shows a two-polarizer liquid crystal display 400 that can include colored polarizers according to the present invention. Liquid crystal display 400 can include a top polarizer 402, an optional retarder or compensator 404, a liquid crystal cell that includes a top substrate 406 a bottom substrate 410 and a liquid crystal material 408 disposed therebetween, a bottom polarizer 412, an optional reflective layer or transflector 414, and an optional back light 416. Either or both of top polarizer 402 and bottom polarizer 412 can include a colored polarizing layer according to the present invention. Reflective or transflective layer 414 can be provided to allow lighting of liquid crystal display 400 using ambient light or light from a front light guide (not shown). Optional back light 416 can be provided to allow back lighting of liquid crystal display 400 with or without optional reflective layer or transflector 414.

Unique styling and appearances can be obtained by including colored polarizers in either or both polarizing elements 402 and 412 in liquid crystal display 400. For example, polarizer element 402 can include a colored polarizing layer that transmits a first color of light having a first linear polarization and a second color of light having a second, orthogonal linear polarization. In operation with ambient illumination, such a construction can exhibit characters, for example, that are colored with the first color transmitted by the colored polarizer and that appear against a background colored with the second color transmitted by the colored polarizer. Other similar visual effects including image reversal effects and color changing effects can be created by using a colored polarizer of the present invention for polarizer 412 and also by using a reflective polarizer for transflector 414 that transmits light of one polarization state and reflects light of another, orthogonal polarization state.

Figure 5:
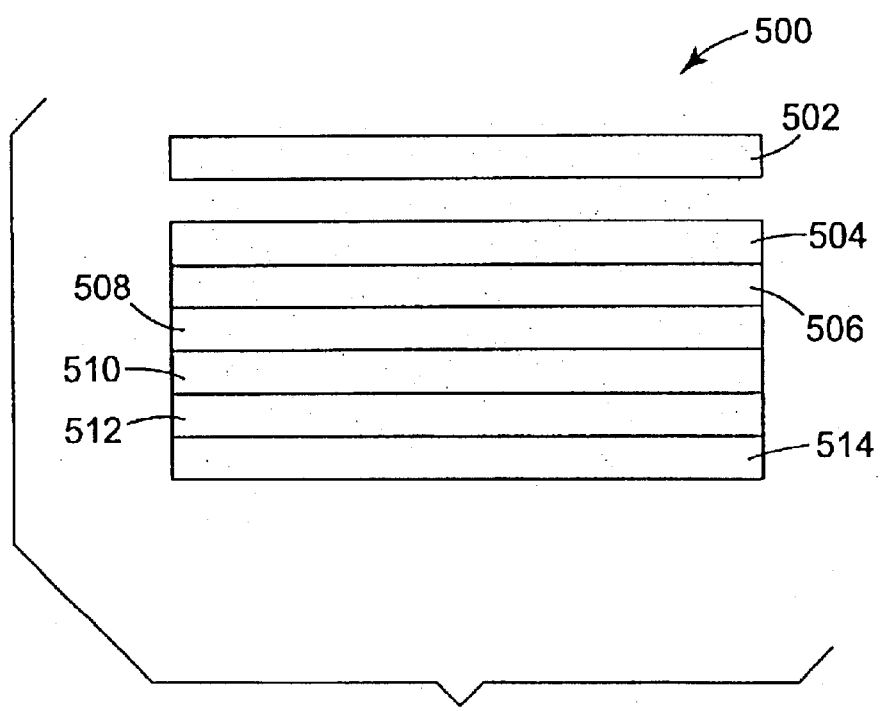
FIG. 5 is a schematic side view of a display that includes one or more colored polarizers.

Colored polarizers according to the present invention can also be used in single-polarizer liquid crystal display configurations. FIG. 5 shows a single-polarizer reflective liquid crystal display 500 that includes an optional front light guide 502, a front polarizer 504, an optional retarder or compensator 506, a liquid crystal cell that includes top substrate 508 a bottom substrate 512 and a liquid crystal material 510 disposed therebetween, and a rear reflector element 514. Reflective liquid crystal display 500 can be lit using either ambient light, or by using a supplemental light source optically coupled to front light guide 502 to illuminate the display when ambient lighting conditions are insufficient. Polarizer 504 can include a colored polarizing layer according to the present invention. Reflector 514 can be a mirror that is either diffusely or specularly reflective, or can be a partially reflective layer, including a partial mirror or a colored mirror, or can be a transflective layer such as a reflective polarizer.

Liquid crystal display 500 can also be used as a transflective display by using a transflector for element 514 and by providing an optional backlight (not shown) disposed behind transflector 514. In exemplary embodiments, transflector 514 can be a reflective polarizer that reflects one polarization state and transmits the orthogonal polarization state, and front polarizer 504 can include one or more dichroic polarizers disposed to transmit one color of light having a first polarization state and another color of light having a second, orthogonal polarization state. For example, front polarizer 504 can include a dual color guest-host polarizer or can include two colored dichroic polarizers having crossed extinction axes. Using a reflective polarizer as transflector 514 and a dual color polarizer or combination of colored polarizers as front polarizer 504, unique coloration effects can be realized. For example, if front polarizer 504 was arranged to transmit blue light having one polarization state and green light having the orthogonal polarization state, display 500 could be provided with a reflective polarizer 514 so that when illuminated from the front, the display appears to have black characters on a blue background and when illuminated from the back, the display appears to have blue characters on a green background. Various other color combinations can be used to make displays that exhibit color changing and image reversal from black-on-color to color-on-color when switched between front lit reflective and back lit transmissive modes.

Color changing effects can also be achieved in a transflective liquid crystal display having a construction similar to that shown in FIG. 5 that uses a colored backlight (not shown) to illuminate the display in a transmissive mode, a reflective polarizer for element 514, and a colored front polarizer 504 that transmits colored light having one polarization and substantially all visible light having the orthogonal polarization. By choosing a colored polarizer 504 that transmits a different color than that emitted by the backlight, unique color styling can be obtained. For example, if the backlight emits green light and the colored polarizer transmits blue light having one polarization state and substantially all visible light having the orthogonal polarization state, the display can be used to exhibit blue characters on a white background in reflective mode (lit from the front) and to exhibit green characters on a dark background in transmissive mode (back lit using the colored backlight). As described above, various other color combinations and image reversal schemes can also be used.

Using a colored backlight in combination with colored polarizers of the present invention in transflective displays can also greatly reduce display washout when used in a back lit mode. When used in a back lit mode where there is significant ambient light, there can be a competition between the reflective and transmissive modes of transflective displays that utilize image reversal (reflective mode shows dark what transmissive mode shows light, and vice versa). This can lead to reduced contrast and a washed out display appearance. However, using a colored backlight can counteract washout effects when used in combination with colored polarizers because the color combinations for back lit mode can be different than the color combinations for front lit mode. Upon image reversal, the different color combinations need not result in reduced contrast, and indeed can result in image enhancement. Image enhancement can be most pronounced when a backlight is chosen that emits light in a band of wavelengths that does not significantly overlap with the wavelength band or bands transmitted by the colored polarizer.

Colored polarizers according to the present invention such as shown in FIG. 1 can be used in display constructions such as shown in FIGS. 2–5 to create various visual effects in monochrome or two-color displays. In addition, colored polarizers according to the present invention can be used in full color liquid crystal displays as primary or secondary polarizing elements or as the color filters themselves. When used as color filters, colored polarizers of the present invention can be used to combine color filtering and linear polarizing functions into single layers or elements. Color filters that also perform a polarizing function can eliminate extra polarizers while providing enhanced display contrast and/or providing the same or similar unique color changing properties as discussed above.

Figure 6:
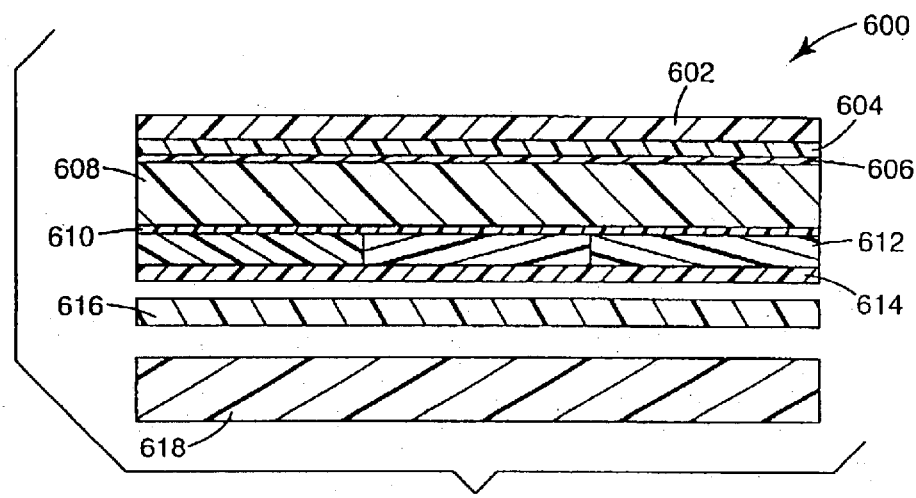
FIG. 6 is a schematic cross-sectional view of a color liquid crystal display that includes one or more colored polarizers.

Referring now to FIG. 6, a color liquid crystal display 600 is shown that includes a top polarizer 602, a top substrate 604, a top alignment layer 606, a liquid crystal layer 608, a bottom alignment layer 610, a color filter layer 612, a bottom substrate 614, a bottom polarizer 616, and an optional back light 618. Colored polarizers according to the present invention can be included in any combination of top polarizer 602, bottom polarizer 616, and/or color filters 612.

Various color combinations and arrangements can be used for color filter array 612. Commonly, full color displays employ a regular pattern of primary color filters for color filter array 612. For example, the color filters can be a regular array of three colors, typically red, green and blue, or cyan, magenta and yellow. The color filters used can be conventional color filters or can be colored polarizers of the present invention. When using colored polarizers of the present invention as color filters in a display, the polarizers can be of the type that transmit one color in one polarization state, absorbing substantially all other light of that polarization state, and transmit substantially all light of the orthogonal polarization state. Alternatively, the polarizers can be of the type that transmit only one color of light having one polarization state and absorb substantially all other visible light. If color filters 612 are colored polarizers according to the present invention that each transmit a single color in the first polarization state and absorb other visible light, bottom polarizer 612 can be optional, although it can still be used to provided for increased display contrast. If color filters 612 are colored polarizers of the present invention of the type that transmit light of one color of the first polarization state and transmit substantially all of the visible light of the second, orthogonal polarization state, then back polarizer 616 is preferably employed, especially when the display is back lit using back light 618.

Using colored polarizers as color filters for color displays can also allow combination sub-pixels to be formed to increase display resolution. For example, red and green orienting dyes can be combined in a single polarizing color filter, thereby creating pixels that have two sub-pixels rather than three. The pixels can thus be made smaller, increasing the overall display resolution. Additionally, in the same example, blue polarizing color filters can be used for the second sub-pixels and can be patterned to have a small overlapping region with the red/green polarizing color filters. The overlapping regions would appear dark and could be used as a black matrix.

Colored guest-host polarizers can be patterned onto display substrates for use as color filters by conventional photolithography techniques as well as by selective thermal mass transfer techniques as described above.

In addition to using colored polarizers in color filters 612, front polarizer 602 can include a colored polarizing layer according to the present invention to achieve various visual effects similar to those described previously. Back polarizer 616 can also include a colored polarizing layer of the present invention to achieve various visual effects, and can also include in addition or in the alternative a neutral density dichroic polarizer, a reflective polarizer such as a multi-layer birefringent reflective polarizer, and/or other desired components.

Figure 7:
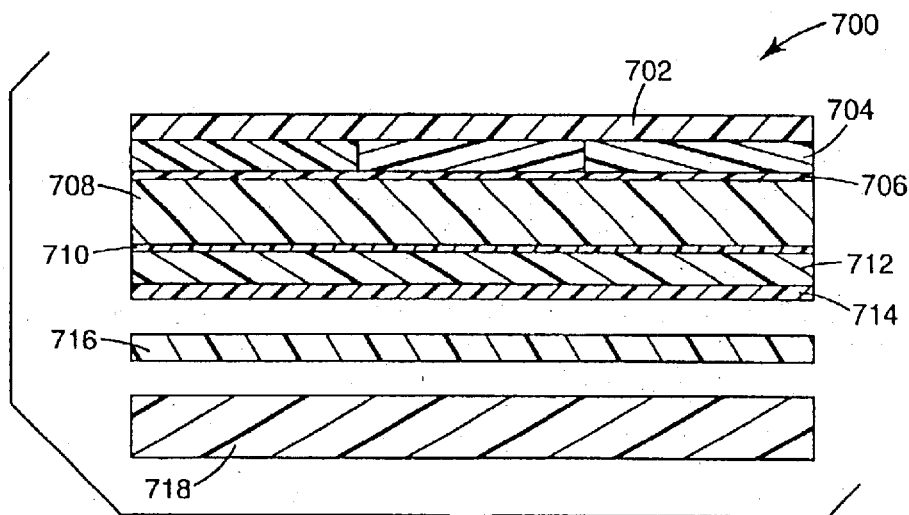
FIG. 7 is a schematic cross-sectional view of a color liquid crystal display that includes one or more colored polarizers.

FIG. 7 shows another color liquid crystal display construction 700 that includes a top substrate 702, a color filter layer 704, a top alignment layer 706, a liquid crystal layer 708, a bottom alignment layer 710, a bottom polarizer 712, a bottom substrate 714, an optional reflector, transflector, reflective polarizer, or other light management film 716, and an optional back light 718. Display 700 differs from display 600 shown in FIG. 6 in at least two respects. First, color filter layer 704 is disposed on the top substrate 702 whereas in FIG. 6 the color filter layer 612 was shown disposed on the bottom substrate. Depending on the particular display construction, it may be more beneficial to dispose the color filter layer on the top substrate rather than the bottom substrate (or vice versa). Second, display 700 includes a bottom polarizer 712 that is disposed on the inside (the liquid crystal side) of substrate 714. Color filters 704 can include colored polarizing elements according to the present invention or can be conventional color filters. Bottom polarizer 712 can also include a colored polarizing layer of the present invention or can be a conventional dichroic polarizer.

Figure 8:
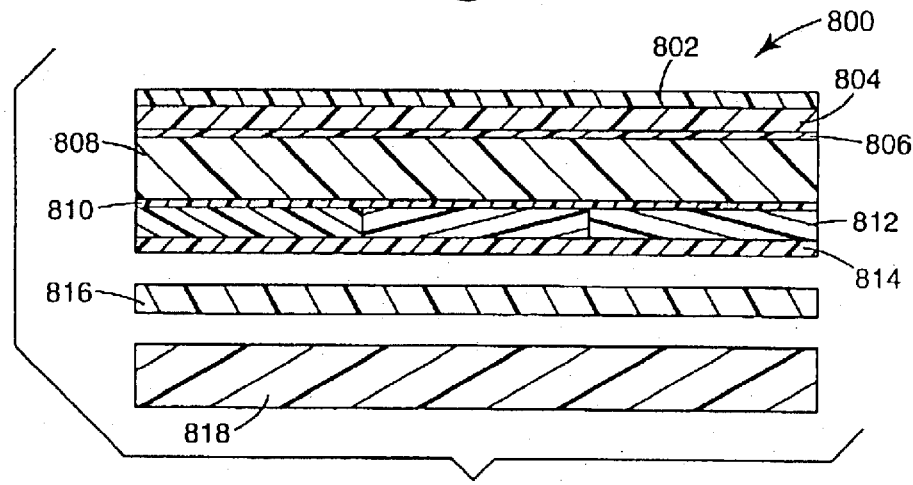
FIG. 8 is a schematic cross-sectional view of a color liquid crystal display that includes one or more colored polarizers.

FIG. 8 shows yet another color liquid crystal display construction 800 that includes a top substrate 802, a top polarizer 804, a top alignment layer 806, a liquid crystal layer 808, a bottom alignment layer 810, a color filter layer 812, a bottom substrate 814, an optional light management layer or layers 816, and an optional back light 818. Display 800 shown in FIG. 8 is similar to the display construction shown in FIG. 7 except that the color filters 812 shown in FIG. 8 are disposed on the bottom substrate 814.

As described above, colored polarizers of the present invention can be used in various display constructions and with various other optical components. One particularly useful combination is a colored polarizing layer of the present invention with a dichroic polarizer where the transmission axis of the dichroic polarizer is aligned with a transmission axis of the colored polarizer. In general, polarizers can be characterized in terms of an extinction ratio. For an arbitrary polarizer having a transmission axis and an extinction axis, the extinction ratio as a function of wavelength is proportional to the transmission as a function of wavelength for light polarized along the transmission axis divided by the transmission as a function of wavelength for light polarized along the extinction axis. The extinction ratio can be averaged, for example, over the visible spectrum to arrive at a numeric ratio. For a pair of adjacent dichroic polarizers having their respective transmission axes aligned, the overall extinction ratio of the pair is equal to their individual extinction ratios multiplied together. For example, if a guest-host polarizer of the present invention has an extinction ratio on the order of 2:1 to 100:1 for a particular wavelength or range of wavelengths, the overall extinction ratio of a polarizer in a display can be increased by combining the colored polarizer with a conventional polarizer.

EXAMPLES

In the following non-limiting examples, dye solutions were prepared by adding various combinations of dyes to an aqueous host solution. The host solution was prepared by first adding a basic compound such as $NH_4OH$ to a quantity of deionized water, so as to form a basic solution suitable for dissolving Compound A or Compound B. It was found that a 0.5% to 2.0% solution by weight of $NH_4OH$ in water was suitable for dissolving Compounds A and B. To this solution either Compound A or Compound B was added along with about 0.1% by weight of a surfactant, such as Triton X-100 commercially available from Rohm & Haas, Philadelphia, Pa., to improve coatability. Example 1 provides a particular host solution. Other host solutions in succeeding Examples differ from the host solution of Example 1 only in the type and quantity of host compound used. Host solutions are specified in the following Examples by host compound and concentration. For example, a 16% host solution of Compound A means that Compound A is present in an amount of 16% by weight of host solution. Host solutions containing 10 to 20 grams of host compound per 100 grams of water (9% to 17% by weight of solution) were used in the Examples and found to be suitable for the present invention, although other concentrations can also be used.

Example 1

Host solutions were prepared by dissolving 16 grams of Compound A in 84 grams of an aqueous solution containing $NH_4OH$ and 16 grams of Compound B in 84 grams of an equivalent aqueous solution containing $NH_4OH$. To each of these solutions was then added 0.1% by weight of a surfactant available from Rohm & Haas under the trade designation Triton X-100, to enhance the coatability of the solutions onto polymeric substrates. The host solutions will hereinafter be referred to as a 16% solution of Compound A or B, respectively.

Example 2

Figure 9:
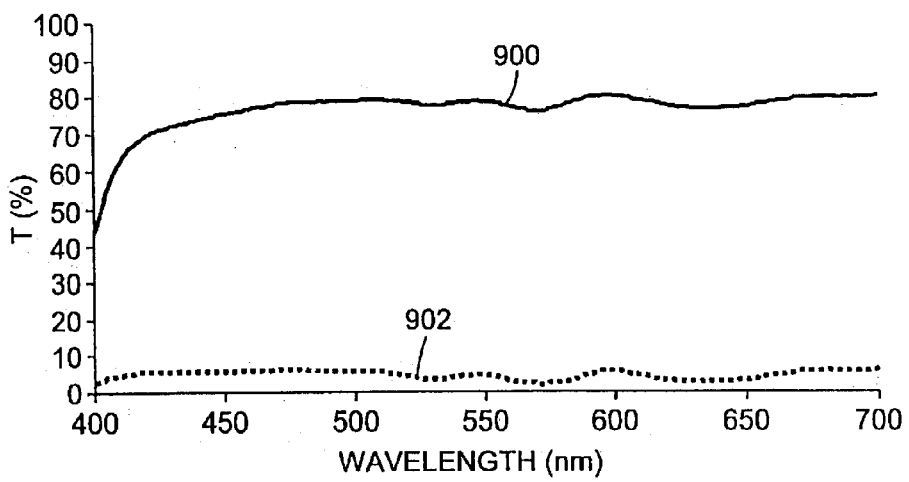
FIG. 9 depicts transmission spectra for a neutral density polarizer made according to the present invention.

A gray parallel-colorless polarizer (transmits visible light polarized parallel to the coating direction, and absorbs substantially all other visible light) was prepared in the following manner:

10 grams of a 16% host solution of Compounds A was prepared. The following were then added to the host solution to make a guest-host solution: 0.24 grams purified Reactive Red KB (Keystone Corp.), 1.62 grams Intrajet Blue JE liquid (Crompton & Knowles Colors, Inc.), and 0.20 grams of purified Reactive Yellow 27 (Golden Yellow EG150 from Keystone Corp.). The guest-host solution was shear coated onto a plastic substrate to a wet-thickness of about 13 microns. The coating was dried, and the transmission, properties of the polarizer were measured over the visible spectrum (400 nm to 700 nm) using a spectrophotometer. FIG. 9 shows transmission spectra for light polarized parallel to the coating direction 900 and for light polarized perpendicular to the coating direction 902. Another gray parallel-colorless polarizer was prepared in the same manner using a 16% host solution of Compound B. The resulting transmission spectra were similar to those shown in FIG. 9.

Example 3

Figure 10:
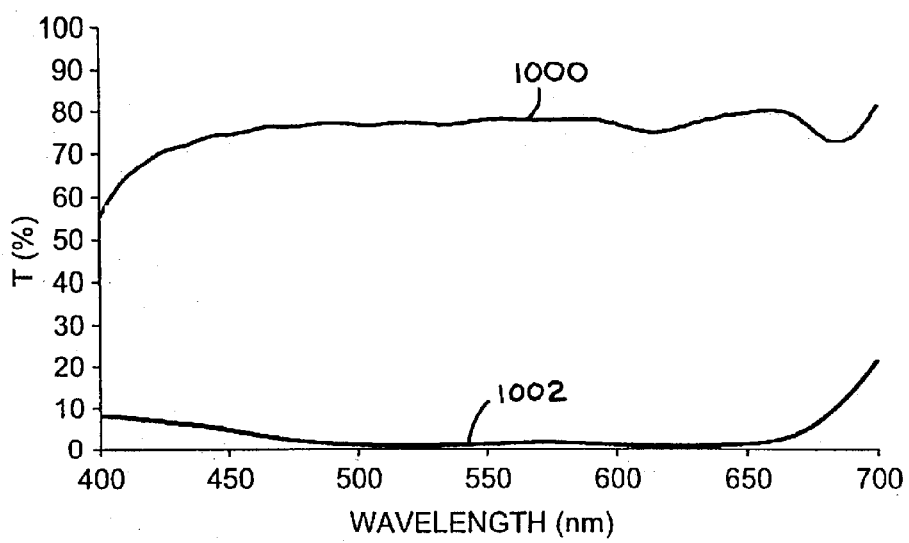
FIG. 10 depicts transmission spectra for a neutral density polarizer made according to the present invention.

A gray perpendicular-colorless polarizer (transmits visible light polarized perpendicular to the coating direction, and absorbs substantially all other visible light) was prepared in the following manner:

10 grams of a 16% host solution of Compounds A was prepared. The following were then added to the host solution to make a guest-host solution: 0.1 grams purified Intrajet Black RPM (Crompton & Knowles), 0.03 grams Intrajet Blue JE liquid (Crompton & Knowles), and 0.12 grams Intrajet Yellow DJR liquid (Crompton & Knowles). The guest-host solution was shear coated as in Example 2. The coating was dried, and the transmission properties of the polarizer were measured over the visible spectrum. FIG. 10 shows transmission spectra for light polarized perpendicular to the coating direction 1000 and for light polarized parallel to the coating direction 1002. Another gray perpendicular-colorless polarizer was prepared in the same manner using a 16% host solution of Compound B. The resulting transmission spectra were similar to those shown in FIG. 10.

Example 4

A green/black colored polarizer was made by combining non-orienting dyes with orienting dyes in a molecular matrix as follows (given in parts by weight):

1.5 parts compound A or B
0.6 parts ammonium hydroxide
7 parts water
0.1 parts non-orienting blue triarylmethane dye (C. I. Food Blue 2, as commercially available from Warner Jenkinson Co.)
0.1 parts Intrajet Blue JE (Crompton & Knowles Colors Inc.)
0.3 parts Keyreact Red KB (Keystone Co.)
0.1 parts Keystone Yellow EG150 (Keystone Co.)
0.2 parts Direct Yellow DJR (Crompton & Knowles Colors Inc.)

When coated onto a glass substrate, this formulation produced a colored polarizer that transmitted green light having one polarization state and substantially no light of the orthogonal polarization state.

Similar colored polarizers were also made by replacing the non-orienting blue dye above (C.I. Food Blue 2) with other non-orienting blue dyes, such as a methylene blue from the thiazine group of dyes.

Examples 5, 6, and 7

A display can be made such as shown in FIGS. 6, 7, and 8 by combining colored polarizers such as those made according to Examples 5, 6, and/or 7 as the color filters.

Example 5

A guest-host cyan transmitting colored polarizer (transmits cyan light polarized parallel to coating direction and absorbs substantially all other visible light) was prepared by combining the following ingredients in solution (given in parts by weight):

20 parts of 16% host solution of Compound B
0.8 parts Black RPM (Crompton & Knowles)
0.2 parts Yellow DJR (Crompton & Knowles)
2.5 parts Blue JE (Crompton & Knowles)

The guest-host solution was coated onto a glass substrate to a wet thickness of 25 microns and dried to form a cyan transmitting color filter.

Example 6

A guest-host magenta transmitting colored polarizer (transmits magenta light polarized parallel to coating direction and absorbs substantially all other visible light) was prepared by combining the following ingredients in solution:

20 parts of 16% host solution of Compound B
0.8 parts Black RPM (Crompton & Knowles)
0.2 parts Yellow DJR (Crompton & Knowles)
0.24 parts Reactive Red KB (Keystone Corp.)

This guest-host solution was coated onto a glass substrate to a wet thickness of 25 microns and dried to form a magenta transmitting color filter.

Example 7

A guest-host yellow transmitting colored polarizer (transmits yellow light polarized parallel to coating direction and absorbs substantially all other visible light) was prepared by combining the following ingredients in solution:

20 parts of 16% host solution of Compound B
0.8 parts Black RPM (Crompton & Knowles)
0.2 parts Yellow DJR (Crompton & Knowles)
0.2 parts Golden Yellow EG150 (Keystone Corp.)

This guest-host solution was coated onto a glass substrate to a wet thickness of 25 microns and dried to form a yellow transmitting color filter.

Example 8

A donor element for light induced thermal transferring colored polarizers according to the present invention was made by coating a 2 micron thick light-to-heat conversion layer containing carbon black dispersed in a thermoplastic binder onto a 100 micron thick polyethylene terephthalate (PET) base sheet, coating a 1.5 micron thick polymer interlayer onto the light-to-heat conversion layer, and coating the cyan guest-host solution of Example 4 onto the interlayer as the transfer layer of the donor element. The cyan guest-host polarizer transfer layer was dried to a thickness of 2 to 5 microns.

The donor element was placed on a glass receptor substrate with the cyan transfer layer contacting the receptor and was held in place by vacuum. Stripes of the colored polarizer transfer layer were imagewise transferred from the donor element to the receptor when the donor element was imaged with 1064 nm light from a Nd:YAG laser using a beam spot size of 140 microns by 150 microns and 8 Watts of power and a variable dwell time.

What is claimed is:

1. A method for imagewise placement of polarizing elements comprising the steps of:
   a) providing a donor element that includes a base sheet, a transfer layer, and a light-to-heat conversion layer disposed between the base sheet and the transfer layer, the transfer layer comprising a guest-host polarizer;
   b) placing the transfer layer of the donor element in contact with a receptor substrate;
   c) transferring portions of the transfer layer from the donor element to selected areas of the receptor substrate by exposing selected areas of the donor element to imaging radiation; and
   d) removing the donor element from the receptor substrate.

2. The method of claim 1, wherein the imaging radiation comprises light from a laser.

3. The method of claim 1, wherein the receptor comprises glass.

4. The method of claim 1, wherein the receptor comprises a polymer film.

5. The method of claim 1, wherein the receptor comprises a display substrate.

6. The method of claim 1, wherein the guest-host polarizer includes a host matrix, one or more first guest dyes disposed in the host matrix and oriented to absorb a rust portion of visible light having a first polarization state, and one or more second guest dyes disposed in the host matrix and oriented to absorb a second portion of visible light having a second polarization state orthogonal to the first polarization state.

7. The method of claim 6, wherein the guest-host polarizer transmits one color of light of the first polarization state and substantially absorbs all visible light of the second polarization state.

8. The method of claim 6, wherein the guest-host polarizer transmits a first color of light of the first polarization state and a second color of light of the second polarization state.

9. The method of claim 6, wherein the host matrix comprises a liquid crystalline material.

10. The method of claim 1, further comprising repeating steps a), b), c), and d) using a second donor element having a second transfer layer comprising a second guest-host polarizer.

* * * * *

UNITED STATES PATENT AND TRADEMARK OFFICE
CERTIFICATE OF CORRECTION

PATENT NO. : 6,730,446 B2
DATED : May 4, 2004
INVENTOR(S) : Sahouani, Hassan

It is certified that error appears in the above-identified patent and that said Letters Patent is hereby corrected as shown below:

Column 14,
Line 52, delete "612" and insert in place thereof -- 616 --

Column 19,
Line 11, delete "rust" and insert in place thereof -- first --

Signed and Sealed this

Ninth Day of November, 2004

JON W. DUDAS
*Director of the United States Patent and Trademark Office*